(12) United States Patent
Hagiwara et al.

(10) Patent No.: US 7,787,984 B2
(45) Date of Patent: Aug. 31, 2010

(54) SPHERING APPARATUS AND OPERATING METHOD THEREOF

(75) Inventors: Yoshiyuki Hagiwara, Kofu (JP); Shinichi Miyake, Tokyo (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 375 days.

(21) Appl. No.: 12/066,752

(22) PCT Filed: Sep. 22, 2005

(86) PCT No.: PCT/JP2005/017473

§ 371 (c)(1),
(2), (4) Date: Apr. 1, 2008

(87) PCT Pub. No.: WO2007/034551

PCT Pub. Date: Mar. 29, 2007

(65) Prior Publication Data

US 2009/0127729 A1 May 21, 2009

(51) Int. Cl.
G06F 19/00 (2006.01)
C03B 13/14 (2006.01)
C03B 9/00 (2006.01)

(52) U.S. Cl. .................... 700/209; 65/142; 65/21.1; 65/21.3

(58) Field of Classification Search ........... 700/209; 425/6; 65/142, 21.1, 21.3, 25.1
See application file for complete search history.

(56) References Cited

U.S. PATENT DOCUMENTS 5,131,457 A * 7/1992 Fitzgerald ............... 165/297
5,611,833 A * 3/1997 Brahmbhatt et al. ....... 65/21.3
5,743,930 A * 4/1998 Miyake et al. ............ 65/142
6,054,073 A * 4/2000 Kobayashi et al. ......... 264/15
7,374,704 B2 * 5/2008 Che et al. .................. 264/13
7,615,201 B2 * 11/2009 Konya et al. .............. 423/337
2002/0041963 A1 * 4/2002 Konya et al. .............. 428/402

FOREIGN PATENT DOCUMENTS

| JP | 7-49100 | 5/1995 |
| JP | 10-85577 | 4/1998 |
| JP | 11-139827 | 5/1999 |

OTHER PUBLICATIONS

International Search Report for PCT/JP2005/017473, mailed Nov. 15, 2005.

* cited by examiner

*Primary Examiner*—Albert DeCady
*Assistant Examiner*—Jason Lin
(74) *Attorney, Agent, or Firm*—Nixon & Vanderhye P.C.

(57) ABSTRACT

A sphering apparatus includes a sphering furnace on a body of which a plurality of adhesion preventing air-introducing holes is formed and at a lower position of which a carrier air-introducing hole and a carrier air-withdrawing hole are formed; an air blower introducing both an adhesion preventing air and a carrier air; a first pipe one end of which is connected to a discharging part of the air blower and the other end of which is biforked, one biforked end being connected to the carrier air-introducing hole and the other biforked end being connected to a manifold bundling the plurality of adhesion preventing air-introducing holes; a first damper provided in any one of two pipes in the biforked part of the first pipe; a cyclone connected to the carrier air-withdrawing hole through a second pipe; and a bag filter connected to the cyclone through a third pipe.

3 Claims, 2 Drawing Sheets

SPHERING APPARATUS AND OPERATING METHOD THEREOF

This application is the U.S. national phase of International Application No. PCT/JP2005/017473, filed 22 Sep. 2005, the entire contents of each of which are hereby incorporated by reference.

TECHNICAL FIELD

The present invention relates to an improvement of an apparatus which produces inorganic spherical particles (hereinafter referred to as a "sphering apparatus") which supplies a raw material inorganic powder (hereinafter referred to as a "raw material") such as silicon dioxide ($SiO_2$) into flames, thereby producing inorganic spherical particles (hereinafter referred to as "particles").

BACKGROUND ART

As an example of a conventional sphering apparatus, the sphering apparatus described in Japanese Patent Publication No. 3331491 is shown in FIG. 2. This sphering apparatus is composed of a sphering furnace 10, a cyclone 20, and a bag filter 30.

The sphering furnace 10 (hereinafter referred to as "furnace 10") melts the raw material in flames, thereby forming particles. The cyclone 20 suctions and classifies the particles formed by the furnace 10, followed by trapping only the particles having a predetermined particle size or more. The bag filter 30 traps the fine particles which are not trapped by the cyclone 20. The particles trapped by the cyclone 20 and the bag filter 30 are separately used or appropriately blended for industrial use.

At the top of the furnace 10, a sphering burner 11 is provided in a vertically downward direction. In the sphering burner 11, the raw material, combustion-assisting gas such as oxygen or air, and fuel gas such as propane gas are supplied. The mixed gas of combustion-assisting gas and fuel gas forms a flame in a downward direction. As the raw material is supplied and melted in the flame, the particles are formed.

The formed particles pass down the furnace 10 and are supplied into the cyclone 20; however, some of the just formed particles occasionally adhere to the inner wall of the furnace 10. The particles adhering to the inner wall form a bulky object, and the surface of this bulky object is heated to a high temperature so that newly formed particles further adhere. When the particles formed in the flame adhere to the inner wall of the furnace 10, the amount of the particles supplied into the cyclone 20 is decreased, so the production efficiency of the product becomes deteriorated. Also, when a bulky object is formed on the inner wall of the furnace 10, the temperature in the furnace 10 is increased, so the amount, the particle size, and so on of the particles formed in the furnace 10 are changed from the predetermined ones, As described above, the adhesion of the particles to the inner wall of the furnace 10 and the formation of a bulky object cause problems.

Therefore, a plurality of adhesion-preventing air-introducing holes 12, 12, . . . is formed in the furnace 10 so as to prevent the particles from adhering to the inner wall of the furnace 10. In FIG. 2, five of the adhesion-preventing air-introducing holes 12, 12, . . . are formed in a vertical row, and a plurality of the vertical rows is formed along the circumferential direction of the furnace 10.

The adhesion preventing air-introducing holes 12, 12, . . . are connected to an air blower 40a (hereinafter referred to as a "blower 40a") through a manifold 41. The air from the blower 40a flows into the furnace 10 through each of the adhesion preventing air-introducing holes 12, 12, . . . so as to prevent the formed particles from adhering to the inner wall of the furnace 10.

Meanwhile, a viewing window which is not illustrated in FIG. 2 is provided in an upward direction at the bottom of the furnace 10, so the inside of the furnace 10 can be viewed. Accordingly, it is possible to check if the particles adhere to the inner wall of the furnace 10 or not.

At the lower part of the furnace 10, a carrier air-introducing hole 13 and a carrier air-withdrawing hole 14 are formed in opposition to each other. To the carrier air-introducing hole 13, an air blower 40b (hereinafter referred to as a "blower 40b") supplying carrier air is connected through a first pipe 42.

As described above, the cyclone 20 classifies and traps the particles having a predetermined particle size. In order to maintain a constant classifying condition and an optimal trapping efficiency of the cyclone 20, it is necessary to maintain an air amount Q (hereinafter referred to as "Q") supplied into the cyclone 20.

The Q is a sum of an adhesion-preventing air amount Qa (hereinafter referred to as "Qa") and a carrier air amount Qb (hereinafter referred to as "Qb"). In other words, the following equation (1) is established.

$$Qa+Qb=Q \quad (1)$$

Therefore, in order to maintain Q constantly, it is necessary to equalize the variation of Qa (hereinafter referred to as "$\Delta Qa$") and the variation of Qb (hereinafter referred to as "$\Delta Qb$"). In other words, the following equation (2) should be fulfilled.

$$\Delta Qa = \Delta Qb \text{ (in which } \Delta Qa, \Delta Qb > 0) \quad (2)$$

However, there is the problem in that it is difficult to equalize $\Delta Qa$ and $\Delta Qb$.

Hereinafter, the reasons causing the aforementioned problem are described in detail.

For example, when the particles start to adhere to the inner wall of the furnace 10, in order to prevent this adhesion, the rotational frequency of the blower 40a is increased so as to increase the current Qa to Qa+$\Delta Qa$ in quantity. Then, the discharging pressure of the blower 40a is increased, and the pressure in the furnace 10 is increased accompanying this. As a result, a pressure difference between the blower 40b and the furnace 10 occurs, and Qb is decreased by this pressure difference. Therefore, in the case of adjusting Qb, it is necessary to take the decreased quantity of Qb into account, which is caused by the pressure difference between the blower 40b and the furnace 10.

Meanwhile, in order to fulfill the equation (2), the rotational frequency of the blower 40b is decreased so as to decrease the current Qb to Qb−$\Delta Qb$ in quantity. Then, the discharging pressure of the blower 40b is decreased, and the pressure in the furnace 10 is decreased. As a result, a pressure difference between the blower 40a and the furnace 10 occurs, and Qa+$\Delta Qa$ is increased by this pressure difference. Therefore, in the case of fulfilling the equation (2), it is necessary to finely adjust $\Delta Qa$ and $\Delta Qb$.

The introduction of the adhesion-preventing air into the furnace 10 has the effect of lowering a temperature in the furnace 10. Therefore, when the particles do not adhere to the inner wall of the furnace 10, it is preferable to decrease Qa in quantity as long as the adhesion of particles does not occur in order to maintain the temperature range for normal operation.

Accordingly, when the particles do not adhere to the inner wall of the furnace 10, it is necessary to decrease Qa in quantity. However, in the case of decreasing Qa in quantity, a variation in the pressure in the furnace 10 and a change in Qb accompanying this occur in a similar way to the aforementioned case where Qa is increased.

As described above, it is difficult to always maintain a constant Q because the pressure in the furnace 10 varies due to the increased and decreased quantities of Qa and Qb. Even if adjustment of the rotational frequencies of the blowers 40a and 40b is attempted at the same time in accordance with the increased and decreased quantities of Qa and Qb, it is very difficult to make the right timing for increasing and decreasing quantities of Qa and Qb, and there is the problem in that the trapping efficiency of the cyclone 20 cannot be prevented from being lowered by the change in Q.

Meanwhile, it is common for the sphering apparatus to continuously operate during several days to several months, so the temperature and the pressure in the furnace 10 vary due to reasons such as the variation of external temperatures between day and night. As a result, there is problem in that the quality and the production efficiency of the particles are deteriorated.

[Patent Reference 1] Japanese Patent Publication No. 3331491

DISCLOSURE OF INVENTION

In light of the aforementioned problems of the prior art, objects of the present invention are to provide a sphering apparatus capable of always maintaining a constant air amount Q suctioned into the cyclone so as to maintain an optimal trapping efficiency, and capable of easily adjusting an adhesion-preventing air amount Qa and a carrier air amount Qb; to provide a sphering apparatus capable of producing particles with high quality at high production efficiency by optimally maintaining the temperature and the pressure in the furnace; and to provide an operating method thereof.

In order to solve these problems, a first aspect of the present invention is a sphering apparatus including a sphering furnace, at the top of which a sphering burner is provided in a vertically downward direction, on the body of which a plurality of adhesion-preventing air-introducing holes is formed, and at a lower part of which a carrier air-introducing hole and a carrier air-withdrawing hole are formed; an air blower connected to the plurality of adhesion preventing air-introducing holes and the carrier air-introducing hole through a first pipe; a cyclone connected to the carrier air-withdrawing hole through a second pipe; a bag filter connected to the cyclone through a third pipe; a cooling air-introducing section provided on the third pipe; and a suction blower connected to the bag filter through a fourth pipe, wherein one end of the first pipe is connected to a discharging part of the air blower, the other end of the first pipe is biforked, one biforked end is connected to the carrier air-introducing hole, the other biforked end is connected to a manifold bundling the plurality of adhesion preventing air-introducing holes, and a first damper is provided in any one of two pipes in the biforked part of the first pipe.

For the sphering apparatus of the present invention, it is preferable to further include a pressure sensor provided in the sphering furnace, which monitors a pressure in the sphering furnace; a first temperature sensor provided in the sphering furnace, which monitors a temperature in the sphering furnace; a second damper provided in the cooling air-introducing section, which adjusts a feed amount of cooling air; a second temperature sensor provided in the third pipe, which monitors a temperature of gas flowing into the bag filter; a third damper provided in the fourth pipe, which adjusts a suction rate of the suction blower; and a control unit connected to and capable of communicating with the pressure sensor, the first temperature sensor, the second temperature sensor, the first damper, the second damper, and the third damper, wherein the control unit carries out computation using a pressure value measured by the pressure sensor and temperature values measured by the first temperature sensor and the second temperature sensor and transmits gate opening-controlling signals to the first damper, the second damper, and the third damper.

Also, for the sphering apparatus of the present invention, it is preferable that the pressure sensor and the first temperature sensor are provided at the upper part of the sphering furnace.

A second aspect of the present invention is an operating method of a sphering apparatus which includes a sphering furnace on the body of which a plurality of adhesion-preventing air-introducing holes is formed and at a lower part of which a carrier air-introducing hole and a carrier air-withdrawing hole are formed, an air blower introducing both adhesion-preventing air and carrier air to the sphering furnace, a first pipe one end of which is connected to a discharging part of the air blower and the other end of which is biforked, the biforked end being connected to the carrier air-introducing hole and the other biforked end being connected to a manifold bundling the plurality of adhesion preventing air-introducing holes, a first damper provided in any one of two pipes in the biforked part of the first pipe, a cyclone connected to the carrier air-withdrawing hole through a second pipe, a bag filter connected to the cyclone through a third pipe, a pressure sensor provided in the sphering furnace, which monitors a pressure in the sphering furnace, a first temperature sensor provided in the sphering furnace, which monitors a temperature in the sphering furnace, a cooling air-introducing section provided on the third pipe, a second damper provided in the cooling air-introducing section, which adjusts a feed amount of cooling air, a second temperature sensor provided in the third pipe, which monitors a temperature of gas flowing into the bag filter, a suction blower connected to the bag filter through a fourth pipe, a third damper provided in the fourth pipe, which adjusts a suction rate of the suction blower, and a control unit connected to and capable of communicating with the pressure sensor, the first temperature sensor, the second temperature sensor the first damper, the second damper, and the third damper, the method including inputting a pressure value measured by the pressure sensor, temperature values measured by the first temperature sensor and the second temperature sensor, a predetermined pressure value, and predetermined temperature values, followed by computing; and transmitting gate opening-controlling signals to the first damper, the second damper, and the third damper, thereby controlling gate openings of the first damper; the second damper, and the third damper.

According to the present invention, an adhesion-preventing air amount Qa and a carrier air amount Qb are adjusted at the same time by using one of the air blower and the first damper, so the sum of the adhesion-preventing air amount Qa and the carrier air amount Qb which are supplied into the furnace, that is an air amount Q suctioned into the cyclone, can always be maintained constantly. Therefore, it is possible to maintain the optimal trapping efficiency of the cyclone. Also, the operation becomes easy because the adjustment can be carried out by using only the first damper.

In addition, according to the present invention, it is possible to optimally maintain the temperature and the pressure in the furnace by using the control unit, so it is possible to produce the particles with high quality at a high production efficiency

Figure 1:
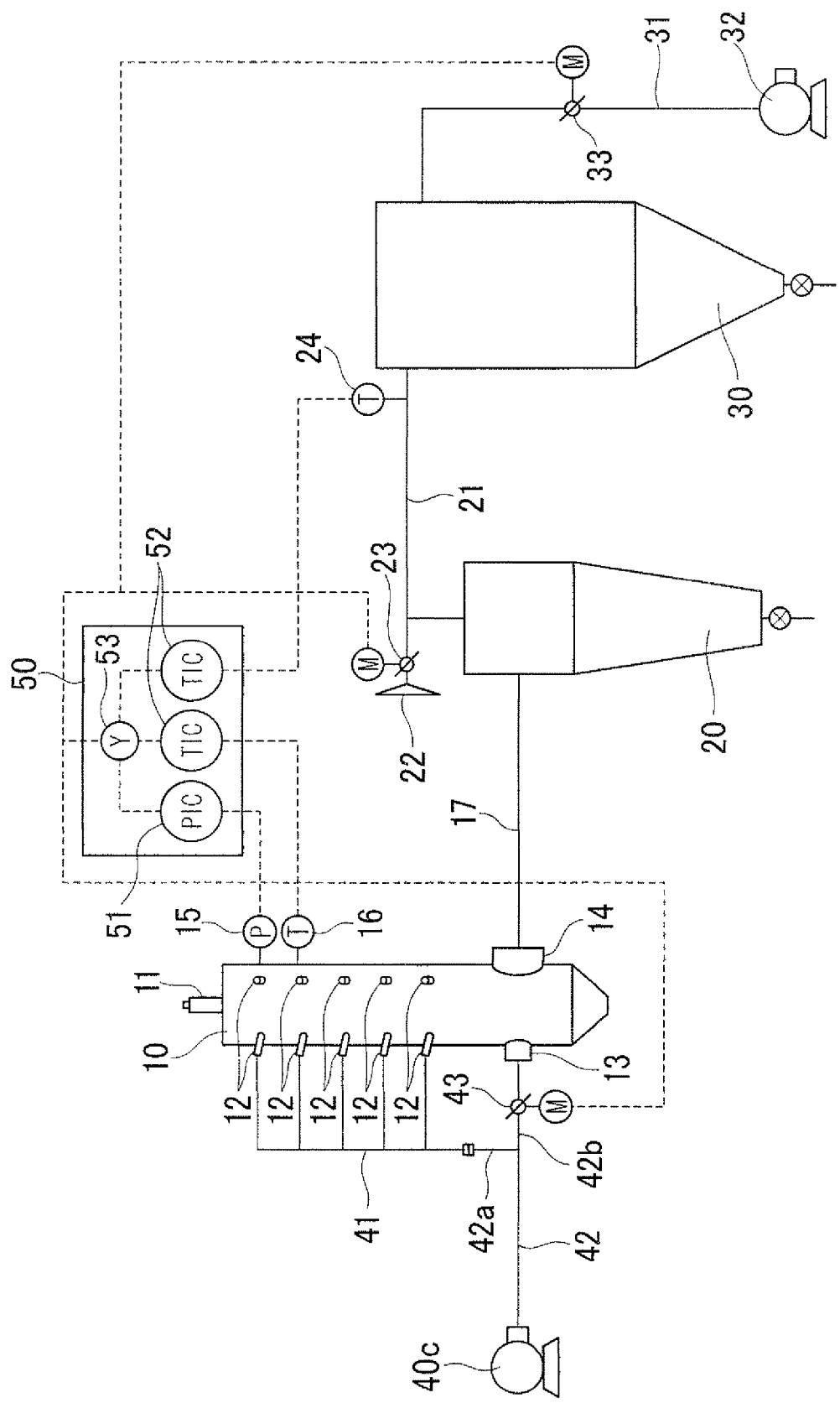
FIG. 1 is a schematic illustration representing an example of the sphering furnace of the present invention.

The reference numerals shown in these figures are defined as follows: 10 . . . sphering furnace, 11 . . . sphering burner, 12 . . . adhesion preventing air-introducing hole, 13 . . . carrier air-introducing hole, 14 . . . carrier air-withdrawing hole, 15 . . . pressure sensor, 16 . . . first temperature sensor, 17 . . . second pipe, 20 . . . cyclone, 21 . . . third pipe, 22 . . . cooling air-introducing section, 23 . . . second damper, 24 . . . second temperature sensor, 30 . . . bag filter, 31 . . . fourth pipe, 32 . . . suction blower, 33 . . . third damper, 40c . . . air blower, 41 . . . manifold, 42 . . . first pipe, 42a . . . one biforked end of the first pipe, 42b . . . the other biforked end of the first pipe, 43 . . . first damper, and 50 . . . control unit.

BEST MODE FOR CARRYING OUT THE INVENTION

Figure 2:
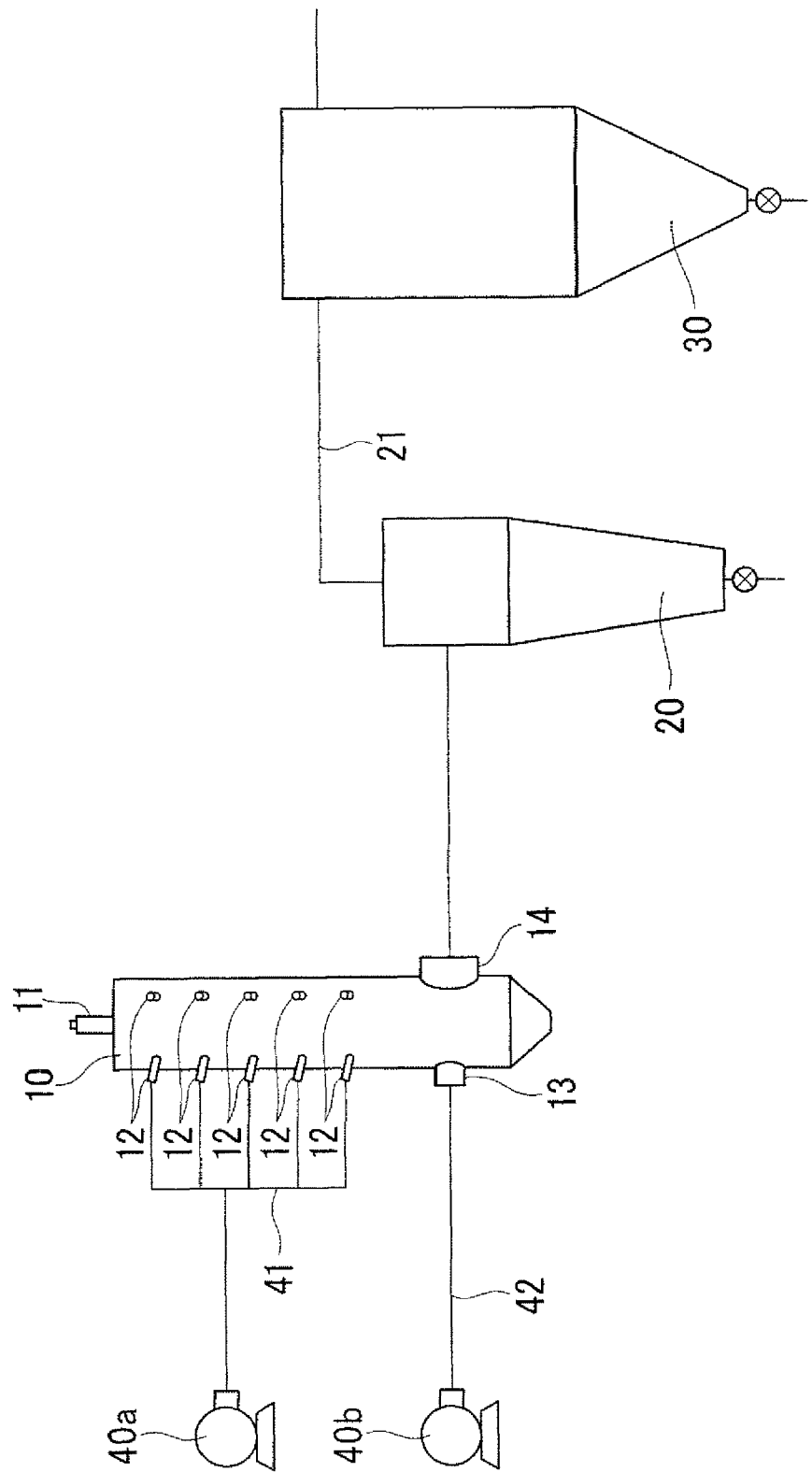
FIG. 2 is a schematic illustration representing an example of a conventional sphering furnace.

Hereinafter, an embodiment of the sphering apparatus of the present invention is described with reference to the drawings. FIG. 1 represents an example of the sphering furnace of the present invention, and the same constituent elements as in the conventional sphering furnace represented by FIG. 2 are numbered with the same numerical references, and the explanations thereof are omitted or simplified.

The main differences between the sphering apparatus represented by FIG. 1 and the conventional sphering furnace are that the first pipe 42 is biforked, one biforked end 42a thereof is connected to a manifold 41, and a control unit 50 is provided.

In a furnace 10 of the sphering furnace of the present invention, only one air blower 40c (hereinafter referred to as the blower 40c) is provided. To the discharging part of this blower 40c, one end of the first pipe 42 is connected. The other end of the first pipe is biforked, and one biforked end 42a is connected to one end of the manifold 41, while the other biforked end 42b is connected to a carrier air-introducing hole 13. A plurality of the other ends of the manifold 41 bundles a plurality of adhesion preventing air-introducing holes 12, 12, . . . . Also, in the other biforked end 42b of the first pipe 42, a first damper 43 is provided so as to adjust the ratio of Qa and Qb. By applying these constitutions, it is possible to supply both the adhesion preventing air and carrier air from one blower 40c into the furnace 10. Also, by using the first damper 43, the ratio of Qa to Qb can be adjusted arbitrarily. In this case, the sum of Qa and Qb does not change due to the adjustment of the ratio, so it is possible to always maintain an air amount Q suctioned into the cyclone constantly and to maintain an optimal trapping efficiency.

Herein, the first damper 43 is not limited to be provided between the biforked point of the first pipe 42 and the career air-introducing hole 13, but can be provided between this biforked point and the manifold 41.

In the furnace 10, a pressure sensor 15 and a first temperature sensor 16 are provided, whereby it is possible to check if the pressure in the furnace 10 is maintained within the appropriate pressure or not and if the temperature is sufficient to melt the raw material or not. Herein, it is preferable to provide the pressure sensor 15 and the first temperature sensor 16 at the upper part of the furnace 10 in order to monitor the area around a flame of a sphering burner 11 in which the particles are formed.

To the carrier air-withdrawing hole 14, one end of a second pipe 17 is connected, and the other end thereof is connected to the entrance part of a cyclone 20. To the exit part of the cyclone 20, one end of a third pipe 21 is connected, and the other end thereof is connected to the entrance part of a bag filter 30.

On the third pipe 21, a cooling air-introducing section 22 is provided. This cooling air-introducing section 22 supplies cooling air into the third pipe 21, so it is possible to decrease the temperature of the gas flowing from the cyclone 20 to the bag filter 30. Also, on the cooling air-introducing section 22, a second damper 23 is provided, whereby it is possible to adjust the amount of cooling air. Also, on the adjacent part of the third pipe 21 to the entrance part of the bag filter 30, a second temperature sensor 24 is provided, whereby it is possible to check if the temperature of the gas flowing into the bag filter 30 is appropriate or not.

As described above, by providing the second damper 23 on the cooling air-introducing section 22, it is possible to adjust the temperature of the gas flowing into the bag filter 30 within the range between 100° C., at which dew condensation of the moisture in the gas neither occurs nor attaches to a filter fabric used in the bag filter 30, and 180° C. which is the upper temperature limit of a conventional filter fabric used in the bag filter 30. Herein, it is preferable for the cooling air-introducing section 22 to be provided on the adjacent part of the third pipe 21 to the exit part of the bag filter 30 in order that the gas at a high temperature and cooling air are sufficiently mixed, thereby lowering the temperature thereof, and then flow into the bag filter 30.

To the exit part of the bag filter 30, one end of a fourth pipe 31 is connected, and the other end thereof is connected to a suction blower 32. This suction blower 32 suctions the gas distributed in the sphering apparatus.

Also, in the fourth pipe 31, a third damper 33 which adjusts a suctioning amount of the suction blower 32 is provided, whereby the suctioning amount of gas distributed in the sphering apparatus can be adjusted.

Herein, it is preferable for the pressure in the furnace 10 to be a negative pressure. In this case, it is possible to adjust the suctioning amount upstream of the cyclone 20 and the pressure in the furnace 10 by adjusting the gate opening of the second damper 23. Therefore, it is possible to prevent the particles from adhering to the inner wall of the furnace 10 and to efficiently eject the particles from the furnace 10 in addition to the aforementioned advantageous effects of adhesion preventing air.

The control unit 50 controls a pressure and a temperature of the gas in the sphering furnace 10, and is composed of a pressure indicating controller (PIC) 51, a temperature indicating controller (TIC) 52, and a computing unit (Y) 53. This control unit 50 is connected to the pressure sensor 15, the first temperature sensor 16, the second temperature sensor 24, the first damper 43, the second damper 23, and the third damper 33 through communication cables. Herein, wireless communication can be applied instead of communication cables as the connecting method between the control unit 50 and each of the constituent elements.

Hereinafter, an example of the operating method of the sphering apparatus using the control unit 50 is described.

Pressure and temperature values measured by the pressure sensor 15, the first temperature sensor 16, and the second temperature sensor 24 are transmitted to the control unit 50 and inputted to the computing unit 53. In this computing unit 53, the computation is carried out on the basis of the inputted pressure and temperature values and the pressure and temperature values predetermined in the pressure indicating controller 51 and the temperature indicating controller 52. Then, gate opening-controlling signals are transmitted from the control unit 53 to the first damper 43, the second damper 23, and the third damper 33 so as to equalize the measured pressure and temperature values and the predetermined pressure and temperature values, and then the gate opening thereof are controlled.

Herein, the aforementioned control is carried out automatically and continuously.

The relationship between the gate opening of each damper, and the temperature and the pressure at the upper part in the furnace 10 is described in Table 1.

TABLE 1

| Operation | Temperature at the upper part in the furnace | Pressure at the upper part in the furnace |
| --- | --- | --- |
| (1) Gate opening of the first damper: wide | Increase | Decrease |
| (2) Gate opening of the first damper: narrow | Decrease | Increase |
| (3) Gate opening of the second damper: wide | Small change | Increase |
| (4) Gate opening of the second damper: narrow | Small change | Decrease |
| (5) Gate opening of the third damper: wide | Small change | Decrease |
| (6) Gate opening of the third damper: narrow | Small change | Increase |

For example, for the purpose of increasing the temperature at the upper part in the furnace 10, operation (1) is carried out. However, the pressure at the upper part in the furnace 10 is decreased, so it is necessary to carry out operation (3) or (6).

Herein, as for the effect on the pressure at the upper part in the furnace 10, the third damper 33 has a greater effect than the second damper 23. Therefore, it is possible to optimally maintain the temperature and the pressure in the furnace 10 by controlling the gate openings of these two dampers in a balanced manner.

Accordingly, by applying the control unit 50 and the operating method of the sphering apparatus using this control unit 50, it is possible to maintain the temperature and the pressure in the furnace 10 and to produce particles with high quality at high production efficiency.

EXAMPLES

Hereinafter, the present invention is described in more detail in the following examples, while the present invention is not limited to these examples.

Example 1

In Example 1 the particle production tests were carried out using the sphering furnace of the present invention represented by FIG. 1 and the conventional sphering furnace represented by FIG. 2, and both tests were compared.

As the furnace 10, a furnace was used with an inner diameter of 600 mm and a height (length) of 3,000 mm, on the inner wall of which four vertical rows of the adhesion-preventing air-introducing holes 12, 12, were formed along the circumferential direction and five of the adhesion-preventing air-introducing holes 12, 12, . . . were formed in each of the vertical rows. Adhesion preventing-air was blown at 100 Nm$^3$/h through each of the adhesion-preventing air-introducing holes 12, 12, . . . so as to evenly distribute adhesion preventing-air on the inner wall of the furnace 10.

As raw material powder, silica powder was used.

In the case of producing spherical silica particles, the preferable temperature range and pressure range at the upper part of the furnace 10 are generally 1,500 to 1,600° C. and −1.0 to −0.8 kPa(G), respectively. Therefore, the predetermined temperature in the temperature indicating controller 52 was set to be 1,550° C. The predetermined pressure in the pressure indicating controller 51 was set to be −0.9 kPa(G). Herein, the pressure is the value on the basis of the atmospheric pressure.

Meanwhile, in the conventional sphering apparatus, the air blower 40a supplying adhesion preventing-air and the air blower 40b supplying carrier air were controlled by hand such that the temperature and pressure at the upper part in the furnace 10 were maintained within the aforementioned preferable temperature range and pressure range.

The results of the tests are described in Table 2.

TABLE 2

| | Temperature at the upper part in the furnace | Pressure at the upper part in the furnace | Production yield |
| --- | --- | --- | --- |
| Preferable temperature range and pressure range | 1,500 to 1,600° C. | −1.0 to −0.8 kPa(G) | — |
| Conventional sphering apparatus (two blowers) | 1,450 to 1,650° C. | −1.2 to −0.7 kPa(G) | 70% |
| Sphering apparatus of the present invention (one blower and one damper) | 1,550 to 1,600° C. | −1.0 to −0.9 kPa(G) | 95% |

From the results of the aforementioned tests, in the case of using the sphering apparatus of the present invention, it became clear that the temperature and pressure at the upper part in the furnace 10 were able to be maintained within the aforementioned preferable temperature range and pressure range and that a production yield as high as 95% was able to be obtained. Also, the obtained particles were high quality with a favorable sphere.

In contrast, in the case of using the conventional sphering apparatus, it became clear that the temperature and pressure at the upper part in the furnace 10 deviated from the aforementioned preferable temperature range and pressure range and that a production yield of only 70% was able to be obtained.

In these examples, a production yield refers to an output of a production relative to an input of a raw material.

INDUSTRIAL APPLICABILITY

According to the sphering apparatus of the present invention, it is possible to produce particles with high quality at high production efficiency by maintaining an optimal trapping efficiency of the cyclone and optimally maintaining the temperature and the pressure in the furnace, so the present invention is useful for industrial purposes.

The invention claimed is:

1. A sphering apparatus comprising:
 a sphering furnace, at the top of which a sphering burner is provided in a vertically downward direction, on the body of which a plurality of adhesion-preventing air-introducing holes is formed, and at a lower part of which a carrier air-introducing hole and a carrier air-withdrawing hole are formed;
 an air blower connected to the plurality of adhesion preventing air-introducing holes and the carrier air-introducing hole through a first pipe;
 a cyclone connected to the carrier air-withdrawing hole through a second pipe;
 a bag filter connected to the cyclone through a third pipe;
 a cooling air-introducing section provided on the third pipe; and
 a suction blower connected to the bag filter through a fourth pipe, wherein
 one end of the first pipe is connected to a discharging part of the air blower,
 the other end of the first pipe is biforked,
 one biforked end is connected to the carrier air-introducing hole,
 the other biforked end is connected to a manifold bundling the plurality of adhesion preventing air-introducing holes, and
 a first damper is provided in any one of two pipes in the biforked part of the first pipe.

2. A sphering apparatus according to claim 1 further comprising:
 a pressure sensor provided in the sphering furnace, which monitors a pressure in the sphering furnace;
 a first temperature sensor provided in the sphering furnace, which monitors a temperature in the sphering furnace;
 a second damper provided in the cooling air-introducing section, which adjusts a feed amount of cooling air;
 a second temperature sensor provided in the third pipe, which monitors a temperature of gas flowing into the bag filter;
 a third damper provided in the fourth pipe, which adjusts a suction rate of the suction blower; and
 a control unit connected to and capable of communicating with the pressure sensor, the first temperature sensor, the second temperature sensor, the first damper, the second damper, and the third damper, wherein
 the control unit carries out computation using a pressure value measured by the pressure sensor and temperature values measured by the first temperature sensor and the second temperature sensor and transmits gate opening-controlling signals to the first damper, the second damper, and the third damper.

3. An operating method of a sphering apparatus which comprises:
 a sphering furnace on the body of which a plurality of adhesion-preventing air-introducing holes is formed and at a lower part of which a carrier air-introducing hole and a carrier air-withdrawing hole are formed,
 an air blower introducing both adhesion-preventing air and carrier air to the sphering furnace,
 a first pipe one end of which is connected to a discharging part of the air blower and the other end of which is biforked, the biforked end being connected to the carrier air-introducing hole and the other biforked end being connected to a manifold bundling the plurality of adhesion preventing air-introducing holes,
 a first damper provided in any one of two pipes in the biforked part of the first pipe,
 a cyclone connected to the carrier air-withdrawing hole through a second pipe,
 a bag filter connected to the cyclone through a third pipe,
 a pressure sensor provided in the sphering furnace, which monitors a pressure in the sphering furnace,
 a first temperature sensor provided in the sphering furnace, which monitors a temperature in the sphering furnace,
 a cooling air-introducing section provided on the third pipe,
 a second damper provided in the cooling air-introducing section, which adjusts a feed amount of cooling air,
 a second temperature sensor provided in the third pipe, which monitors a temperature of gas flowing into the bag filter,
 a suction blower connected to the bag filter through a fourth pipe,
 a third damper provided in the fourth pipe, which adjusts a suction rate of the suction blower, and
 a control unit connected to and capable of communicating with the pressure sensor, the first temperature sensor, the second temperature sensor, the first damper, the second damper, and the third damper, the method comprising:
 inputting a pressure value measured by the pressure sensor, temperature values measured by the first temperature sensor and the second temperature sensor, a predetermined pressure value, and predetermined temperature values, followed by computing; and
 transmitting gate opening-controlling signals to the first damper, the second damper, and the third damper, thereby controlling gate openings of the first damper, the second damper, and the third damper.

* * * * *